United States Patent
Lavoie

(10) Patent No.: US 7,284,456 B2
(45) Date of Patent: Oct. 23, 2007

(54) APPARATUS FOR MOVING A MEASURING DEVICE ALONG A PIPE

(75) Inventor: Éric Lavoie, Montréal (CA)

(73) Assignee: Hydro-Quebec of Montreal, Montreal (CA)

( * ) Notice: Subject to any disclaimer, the term of this patent is extended or adjusted under 35 U.S.C. 154(b) by 281 days.

(21) Appl. No.: 10/541,609

(22) PCT Filed: Jan. 5, 2004

(86) PCT No.: PCT/CA2004/000005

§ 371 (c)(1),
(2), (4) Date: Jul. 7, 2005

(87) PCT Pub. No.: WO2004/063660

PCT Pub. Date: Jul. 29, 2004

(65) Prior Publication Data

US 2006/0048589 A1    Mar. 9, 2006

(30) Foreign Application Priority Data

Jan. 8, 2003    (CA)    ................................ 2416275

(51) Int. Cl.
*F16L 55/00* (2006.01)
*G01N 21/952* (2006.01)
*G01B 17/02* (2006.01)
*G01B 21/08* (2006.01)
*G01M 19/00* (2006.01)

(52) U.S. Cl. ...................... 73/866.5; 73/622; 73/865.9; 348/84

(58) Field of Classification Search .... 73/865.8–865.9, 73/866.5, 622, 592; 348/84; 376/245
See application file for complete search history.

(56) References Cited

U.S. PATENT DOCUMENTS

| 3,921,440 | A |   | 11/1975 | Toth |
| 4,331,034 | A | * | 5/1982 | Takeda et al. ............. 73/592 X |
| 4,375,165 | A |   | 3/1983 | de Sterke |
| 4,404,853 | A | * | 9/1983 | Livingston ................... 73/622 |
| 4,485,344 | A |   | 11/1984 | de Sivry et al. |
| 4,555,665 | A |   | 11/1985 | Stanley et al. |
| 4,607,925 | A |   | 8/1986 | Kamigaichi et al. |
| 4,611,170 | A |   | 9/1986 | Stanley et al. |
| 4,843,884 | A |   | 7/1989 | House et al. |

(Continued)

FOREIGN PATENT DOCUMENTS

EP    412396 A2 *    2/1991

(Continued)

*Primary Examiner*—Thomas P. Noland
(74) *Attorney, Agent, or Firm*—Baker & Hostetler LLP

(57) ABSTRACT

The apparatus is for displacing a measurement device along a pipe. The apparatus comprises a bracelet; a support device for supporting the measurement device in relation to the bracelet; at least one drive wheel each having an axis, mounted on the bracelet and oriented for displacing the bracelet along the pipe; a flexible transmission device having an inlet for receiving a rotational movement and an outlet for transmitting the rotational movement; a gear device mounted on the bracelet for reorienting the rotational movement coming from the outlet of the flexible transmission device towards the axis of the wheel; and a coupling device for coupling the gear device to the axis of the wheel.

20 Claims, 4 Drawing Sheets

U.S. PATENT DOCUMENTS

| | | |
|---|---|---|
| 4,879,973 A | 11/1989 | Maeyama et al. |
| 5,243,862 A * | 9/1993 | Latimer .................... 73/622 X |
| 5,313,837 A | 5/1994 | Haynes |
| 5,359,898 A * | 11/1994 | Latimer .................... 73/622 X |
| 5,420,427 A | 5/1995 | Morgan et al. |
| 5,506,503 A * | 4/1996 | Cecco et al. ................ 324/220 |
| 5,577,088 A | 11/1996 | Senevat et al. |
| 5,585,565 A | 12/1996 | Glascock et al. |
| 5,591,925 A | 1/1997 | Garshelis |
| 5,594,162 A | 1/1997 | Dolan et al. |
| 5,770,800 A | 6/1998 | Jenkins et al. |
| 5,952,762 A | 9/1999 | Larsen et al. |
| 5,963,030 A | 10/1999 | Stark |
| 5,982,839 A * | 11/1999 | Hatley ........................ 376/245 |
| 6,000,288 A | 12/1999 | Kwun et al. |
| 6,003,377 A | 12/1999 | Waag et al. |
| 6,222,897 B1 * | 4/2001 | Hatley et al. ................ 376/245 |
| 6,497,159 B1 * | 12/2002 | Lavoie ....................... 73/866.5 |
| 6,945,113 B2 * | 9/2005 | Siverling et al. ............. 73/622 |

FOREIGN PATENT DOCUMENTS

| | | |
|---|---|---|
| WO | WO 01/96808 A2 | 12/2001 |
| WO | WO 2005/048271 A1 * | 5/2005 |

* cited by examiner

APPARATUS FOR MOVING A MEASURING DEVICE ALONG A PIPE

The invention concerns an apparatus for displacing a measurement device along a pipe. More specifically, the invention proposes an apparatus for displacing a measurement device that, for example, is used to measure the thickness of the pipe.

In the international application No. WO 0196808 (LAVOIE) published Dec. 20, 2001, a bracelet enabling, for example, the measurement of the thickness of reactor supply pipes (RSP) for CANDU 6 type nuclear power plants is shown. The bracelet in question is composed of an aluminum frame for retaining a flexible ring attachment provided with fourteen ultrasonic sensors. The bracelet enables the manual inspection of the first and second elbowed sections of the supply pipes, where the majority of imperfections are found. Nevertheless, this bracelet presents the inconvenience that it must be manually placed on the pipe, thus limiting its range of action to the length of the operator's arm. Thus, this bracelet does not enable a complete study of the state of wear of the reactor pipes, inasmuch as it is not able to obtain the necessary information on the thickness of the pipes that are inaccessible to the operator.

Furthermore, the U.S. Pat. No. 5,420,427 (MORGAN et al.) shows an apparatus for inspecting pipes that comprises a bracelet equipped with a motorization device for displacing the bracelet over a limited section of the pipe and for rotatively displacing the probes disposed around the bracelet. The motorization system of the bracelet along the pipe is composed of a threaded rod rotatively driven by a gear coupled to a motor. The bracelet is mounted on the threaded rod according to a carriage principle and is thusly displaced along the pipe. The principle requires that the threaded rod and its support be installed beforehand on the segment of limited mobility of the bracelet, and is in no way adapted for displacing a bracelet along an elbow or in a place that is manually inaccessible.

The U.S. Pat. Nos. 4,611,170 and 4,555,665 (STANLEY et al.) show the displacement of a device along a tubular structure by simple pulling with the help of a cord attached to the device to be displaced along the pipe and wound at the other end around a drum or pulley of a stationary transducer. The pulley system proposed by STANLEY et al. faces the same problems as the system proposed by MORGAN et al.

The U.S. Pat. No. 5,963,030 (STARK) shows an apparatus for inspecting a pipe composed of a bracelet that is manually centered and displaced along the pipe on rollers.

The U.S. Pat. No. 4,375,165 (DE STERKE) shows a system for inspecting joints in pipelines. The inspection device is suspended from a rail disposed above the pipe to be inspected.

There also exist additional American patents that describe different inspection devices, and they have the following numbers: U.S. Pat. Nos. 4,485,344; 4,607,925; 4,843,884; 5,313,837; 4,879,973; 5,577,088; 5,585,565; 5,591,925; 5,594,162; 5,962,762; 6,000,288 and 6,003,377.

None of the above-mentioned devices enables the inspection of pipes along sections of pipes that are bent or which are situated in locations that are beyond the reach of the arm of an operator who is performing the inspection.

An objective of the present invention is to propose an apparatus for displacing a measurement device along a pipe that overcomes the different inconveniences mentioned here above.

The present invention concerns an apparatus for displacing a measurement device along a pipe, comprising a bracelet having two extremities provided with closing means for closing the bracelet around the pipe; supporting means for supporting the measurement device in relation to the bracelet; at least one drive wheel each having an axis, mounted on the bracelet and oriented for displacing the bracelet along the pipe; flexible transmission means having an inlet for receiving a rotational movement and an outlet for transmitting the rotational movement; gear means mounted on the bracelet for reorientating the rotational movement coming from the outlet of the flexible transmission means towards the axis of the wheel; and coupling means for coupling the gear means to the axis of the wheel.

The present invention also concerns an apparatus for displacing a measurement bracelet along a pipe, comprising at least one drive wheel each having an axis, mounted on the bracelet and oriented for displacing the bracelet along the pipe; flexible transmission means having an inlet for receiving a rotational movement and an outlet for transmitting the rotational movement; gear means for reorienting the rotational movement coming from the outlet of the flexible transmission means towards the axis of the wheel; and coupling means for coupling the gear means to the axis of the wheel.

The objects, advantages and other characteristics of the present invention will become clear in the non limiting description that follows with preferred embodiments, while making reference to the appended drawings.

DETAILED DESCRIPTION OF THE DRAWINGS

Figure 1:
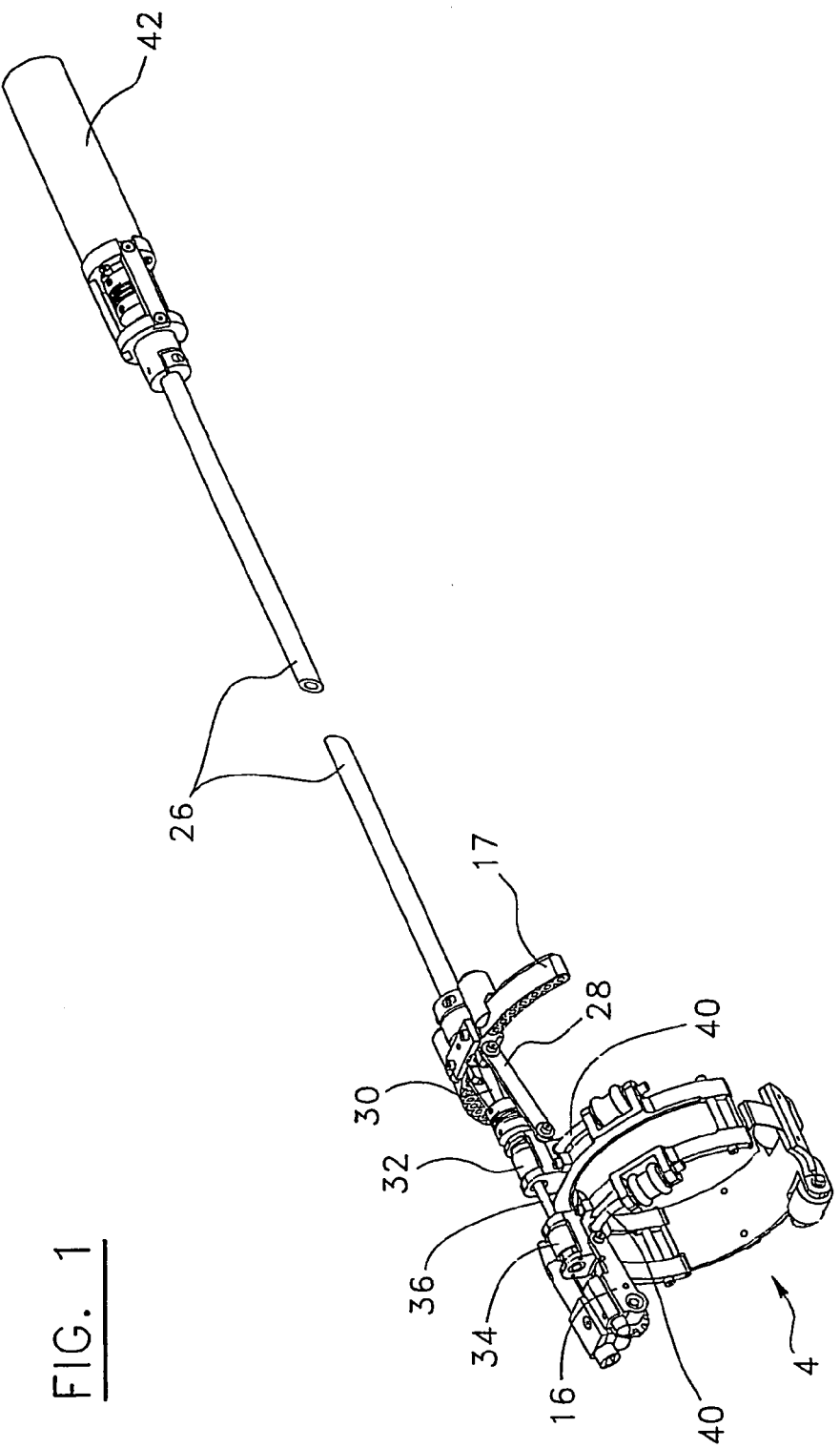
FIG. 1 is a perspective view of a preferred embodiment of the invention.
Figure 2:
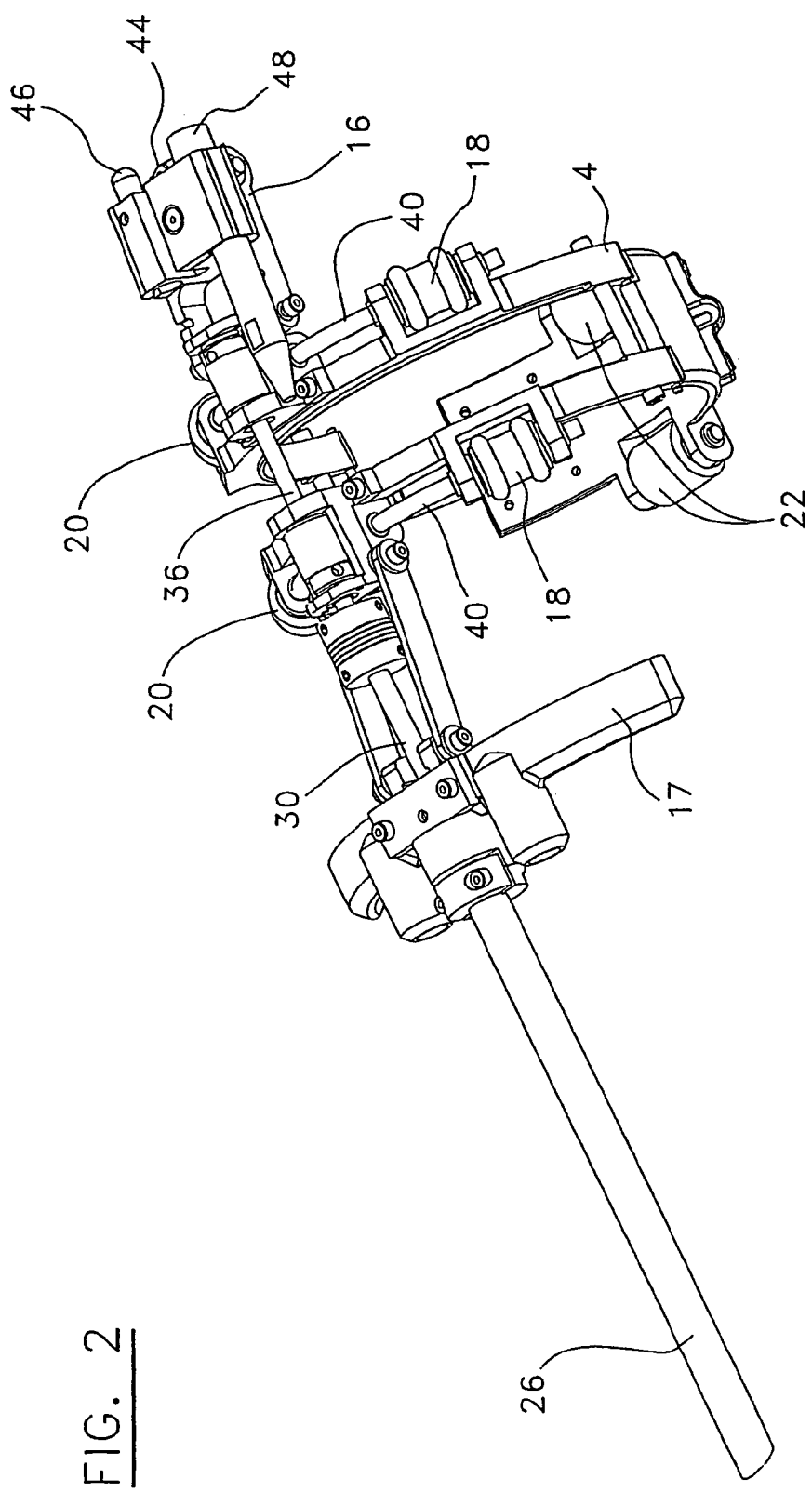
FIG. 2 is a perspective view of a part of the preferred embodiment shown in FIG. 1.

In the different figures of the drawings, the corresponding elements are identified by the same numeric references.

Referring to FIGS. 1 to 4, the apparatus according to the present invention is for displacing a measurement device along a pipe (not shown). The apparatus comprises a bracelet 4 that is shown in more detail in FIG. 3. The bracelet has two extremities provided with closing means for closing the bracelet 4 around the pipe. Preferably, the bracelet comprises two parts 6 and 8 in the form of half circles. The two parts 6 and 8 have first extremities connected by a pivot axis 10 and second free extremities on which the closing means is disposed. The pivot axis 10 enables the two parts to open to be installed around the pipe and then be closed for being fixed around the pipe by the closing means. Preferably, the closing means comprise a hook-shaped element 12 mounted on one of the second extremities of the bracelet, and a rod 14 mounted on the other second extremity and able to cooperate with the hook-shaped element 12 for closing the bracelet around the pipe.

The apparatus also comprises supporting means for supporting the measurement device in relation to the bracelet 4. Of course, different measurement devices can be mounted in relation to the bracelet. In the present case, ultrasonic sensors (not shown) similar to those shown in the international application No. WO 0196808 (LAVOIE) can be mounted on the body of the bracelet. In this case, a coupling diffuser for coupling 17 is provided for cooperating with the ultrasonic sensors. The supporting means for supporting the measurement device preferably comprises, therefore, in the present case, a support arm 28 for supporting a part of the measurement device, such as the coupling diffuser, in relation to the bracelet.

The apparatus also comprises at least one drive wheel. Each drive wheel has an axis. Each wheel is mounted on the bracelet and oriented for displacing the bracelet along the pipe. Preferably, several drive wheels are provided and the apparatus furthermore comprises at least one free wheel oriented in the same manner as the drive wheels. In the context of the present application, free wheel indicates a wheel that is not connected to driving means.

Figure 3:
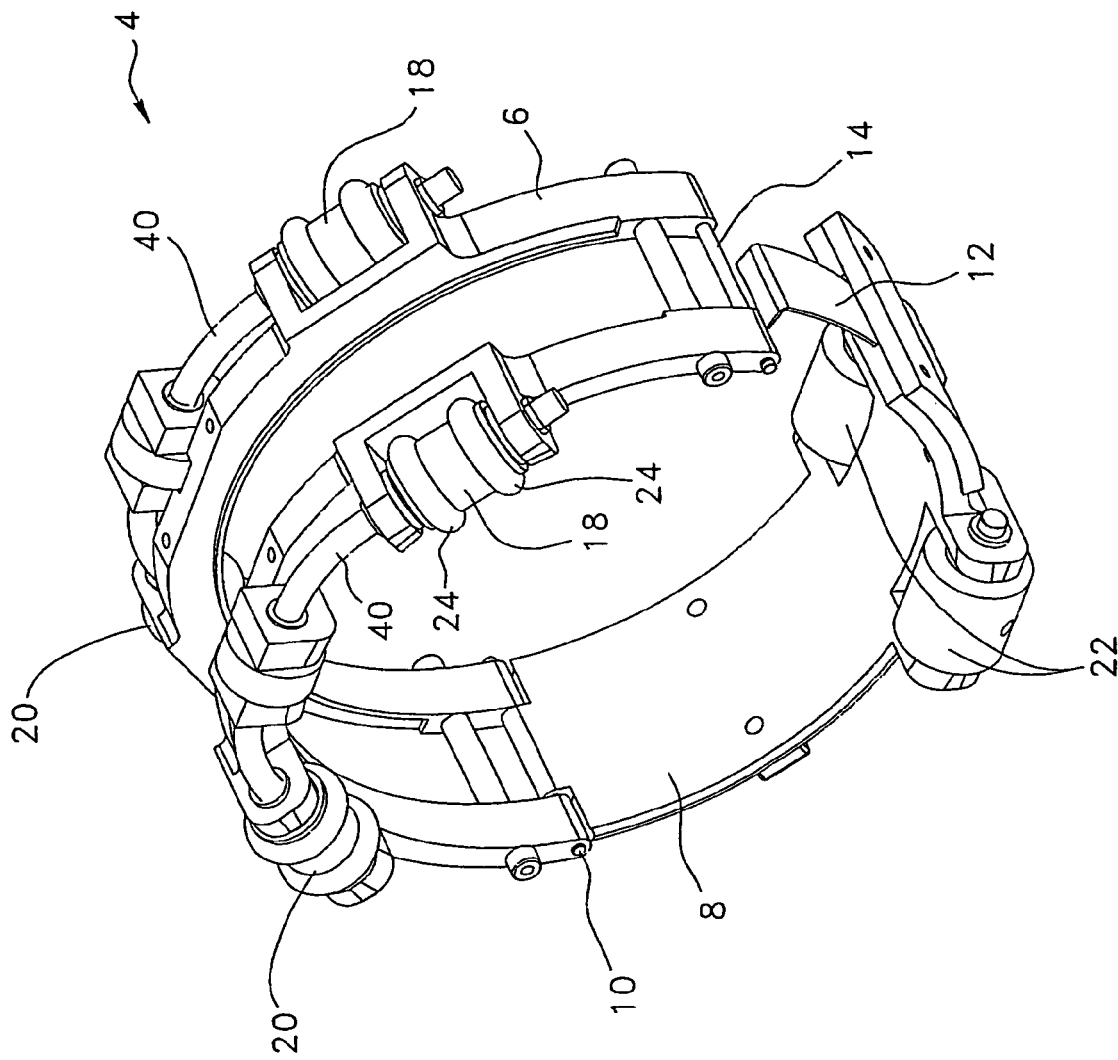
FIG. 3 is a perspective view of a part of the preferred embodiment shown in FIG. 1.
Figure 4:
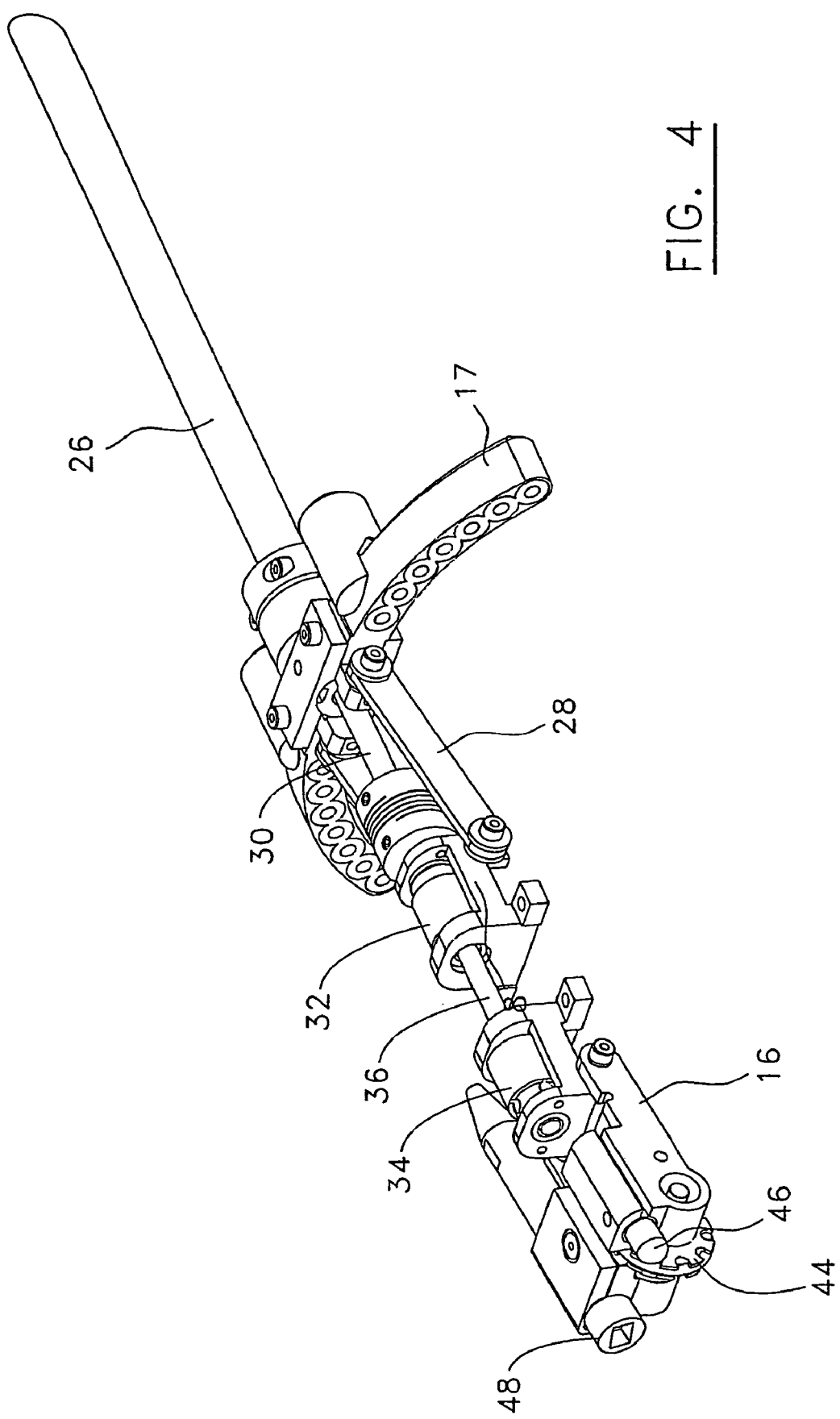
FIG. 4 is a perspective view of a part of the preferred embodiment shown in FIG. 1.

The free and drive wheels are regularly distributed along the bracelet. Still preferably, the drive wheels are grouped in first and second pairs of wheels 18 and 20, and the free wheels are grouped in a third pair of wheels 22, each of the pairs of wheels has its wheels distributed according to a longitudinal axis of the pipe, as can be seen in FIG. 3. The pairs of wheels are distributed regularly along the bracelet. Still preferably, each of the drive wheels takes the form of a roller on which two tires 24 are mounted. A single drive wheel can be sufficient for driving the bracelet along the pipe. The free wheels can be replaced by non mobile elements that slide along the pipe.

The apparatus comprises flexible transmission means having an inlet for receiving a rotational movement and an outlet for transmitting this rotational movement. Preferably, these flexible transmission means comprise a first primary flexible transmission shaft 26 having an inlet for receiving the rotational movement and an outlet supported by the support arm 28 of the bracelet 4. Still preferably, the flexible transmission means also comprise a second primary flexible transmission shaft 30 for connecting the outlet of the first primary flexible transmission shaft 26 to gear means. The apparatus therefore comprises these gear means which are mounted on the bracelet for reorienting the rotational movement coming from the outlet of the flexible transmission means towards the axes of the drive wheels. Preferably, these gear means comprise first and second gears 32 and 34 for respectively driving the wheels of the first and second pairs of wheels 18 and 20 via coupling means. The first gear 32 has an inlet for receiving the outlet of the second primary flexible transmission shaft 30 and an outlet for driving the second gear 34 by means of a flexible transmission shaft 36.

The apparatus comprises the coupling means mentioned hereinabove for coupling the gear means to the axes of the drive wheels. These coupling means comprise secondary flexible transmission shafts 40 for driving the first and second pairs of drive wheels 18 and 20. Furthermore, the apparatus may comprise a motor 42 attached to the transmission means for producing the rotational movement.

Preferably, the apparatus further comprises visual inspection means comprising a light 46, a camera 48 and an encoder 44, mounted to a chassis, and a support arm 16 for mounting the chassis in relation to the bracelet. The visual inspection means enables the inspection of the pipe by the apparatus operator. The support arm 16 has a first part fixed to the second gear 34, and a second part on which the chassis of the visual inspection means is fixed.

According to another preferred embodiment of the invention, the apparatus is adapted for displacing a measurement bracelet along a pipe. In this case, the apparatus comprises at least one drive wheel, flexible transmission means for transmitting the rotational movement, gear means for reorienting the rotational movement coming from the flexible transmission means towards the axis of the drive wheel, and coupling means for coupling the gear means to the axis of the drive wheel. The apparatus according to the present invention enables the displacement of a bracelet in a motorized fashion along a pipe and even along an elbow of this pipe.

An umbilical cord enables the connection of the different elements mounted on the ring attachment to measurement apparatuses. The first primary flexible transmission shaft 26 has a centered position, which enables it to be integrated in the umbilical cord, which also contains the coupling power supply, the wire for the encoder and the wires for the ultrasonic sensors.

The dimensions of the apparatus are chosen in accordance with the size of the RSPs to be examined. The apparatus is preferably thin for enabling its passage in constrained places (i.e. tight or limited spaces). The closing means of the bracelet can be advantageously activated from a distance. The tires enable better traction. Instead of being equipped with tires, the wheels can be entirely made of rubber or another traction aiding material. The free wheels serve as support wheels.

Preferably, the motor 42 is an in-line motor "floating" in the umbilical cord, that is to say, that the motor is integrated in the umbilical cord which connects a control and command case (not shown) to the bracelet which depends thereon. The fastening of the motor 42 to the sheath of the umbilical cord, which is itself fixed to the bracelet (i.e. by means of the diffuser 17 and the support arm 28), advantageously contributes to the appropriate maintenance of the motor 42 so that it efficiently drives the primary transmission shaft 26 without having to be otherwise fixed, for example, to an external structure of the apparatus. Such an assembly notably enables the motor 42 to follow the displacement of the bracelet. Other assemblies can however be realized if desired. The driving of the wheels is done by primary flexible shafts 26 and 30 coupled between the motor and the secondary flexible shafts 40 on each side of the bracelet. The encoder 44 is a proximity detector encoder. The diffuser 17 for coupling is integrated into the assembly. The distance between the diffuser 17 and the ring assembly is constant. As a security measure, a steel wire can be fixed to the bracelet for enabling it to be taken back in the eventuality that the apparatus is subject to a malfunction.

Although the present invention has been explained herein above by way of a preferred embodiment thereof, it would be understood by someone skilled in the art that the invention is not limited to this precise embodiment and that various changes and modifications may be effected therein without departing from the scope or spirit of the invention.

The invention claimed is:

1. An apparatus for displacing a measurement device along a pipe, comprising:
   a bracelet having two extremities provided with closing means for closing the bracelet around the pipe;
   supporting means for supporting the measurement device in relation to the bracelet;
   at least one drive wheel each having an axis, mounted on the bracelet and oriented for displacing the bracelet along the pipe;
   flexible transmission means having an inlet for receiving a rotational movement and an outlet for transmitting the rotational movement;
   gear means mounted to the bracelet for reorienting the rotational movement coming from the outlet of the flexible transmission means towards the axis of the wheel; and coupling means for coupling the gear means to the axis of the wheel.

2. An apparatus according to claim 1, wherein the flexible transmission means comprise:
- a first primary flexible transmission shaft having an inlet for receiving the rotational movement, and an outlet supported by a support arm of the bracelet, and
- a second primary flexible transmission shaft for connecting the outlet of the first primary flexible transmission shaft to the gear means.

3. An apparatus according to claim 2, further comprising at least one free wheel oriented in the same manner as said at least one drive wheel, said at least one drive wheel comprising drive wheels, the free and drive wheels being distributed regularly along the bracelet.

4. Apparatus according to claim 2, wherein each drive wheel takes the form of a roller on which two tires are mounted.

5. Apparatus according to claim 2, further comprising a motor connected to the transmission means for producing the rotational movement.

6. An apparatus according to claim 1, further comprising at least one free wheel oriented in the same manner as said at least one drive wheel, said at least one drive wheel comprising drive wheels, the free and drive wheels being distributed regularly along the bracelet.

7. An apparatus according to claim 6, wherein:
- the drive wheels are grouped into first and second pairs of wheels;
- said at least one free wheel comprising free wheels grouped in a third pair of wheels;
- each of the pairs of wheels having its wheels divided along a longitudinal axis of the pipe;
- the pairs of wheels being distributed regularly along the bracelet; and
- the gear means comprise first and second gears for respectively driving the wheels of the first and second pairs of wheels via the coupling means, the first gear having an inlet for receiving the outlet of the flexible transmission means, and an outlet for driving the second gear.

8. Apparatus according to claim 7, wherein the coupling means comprise secondary flexible transmission shafts for driving the first and second pairs of wheels.

9. Apparatus according to claim 8, further comprising a motor connected to the transmission means for producing the rotational movement.

10. Apparatus according to claim 7, wherein the supporting means comprise a support arm for supporting a part of the measurement device in relation to the bracelet.

11. Apparatus according to claim 7, wherein each drive wheel takes the form of a roller on which two tires are mounted.

12. Apparatus according to claim 7, further comprising a motor connected to the transmission means for producing the rotational movement.

13. Apparatus according to claim 7, wherein the bracelet comprises two parts in the form of half-circles, having first extremities connected by a pivot axis and second free extremities on which the closing means is disposed.

14. Apparatus according to claim 1, wherein each drive wheel takes the form of a roller on which two tires are mounted.

15. Apparatus according to claim 1, further comprising a motor connected to the transmission means for producing the rotational movement.

16. Apparatus according to claim 1, wherein the bracelet comprises two parts in the form of half-circles, having first extremities connected by a pivot axis and second free extremities on which the closing means is disposed.

17. Apparatus according to claim 16, wherein the closing means comprise a hook-shaped element mounted on one of the second extremities of the bracelet, and a rod mounted to the other second extremity of the bracelet and able to cooperate with the hook-shaped element for closing the bracelet around the pipe.

18. Apparatus according to claim 1, further comprising visual inspection means including a light, a camera and an encoder, mounted on a chassis, and a support arm for mounting the chassis in relation to the bracelet.

19. Apparatus according to claim 1, further comprising a sheath covering the flexible transmission means and fixed to the bracelet, and a motor coupled to the flexible transmission means and fixed to the sheath.

20. An apparatus for displacing a measurement bracelet along a pipe, comprising:
- at least one drive wheel each having an axis, mounted on the bracelet and oriented for displacing the bracelet along the pipe;
- flexible transmission means having an inlet for receiving a rotational movement and an outlet for transmitting the rotational movement;
- gear means for reorienting the rotational movement coming from the outlet of the flexible transmission means towards the axis of the wheel; and
- coupling means for coupling the gear means to the axis of the wheel.

* * * * *